(12) United States Patent
Maskaleris

(10) Patent No.: US 7,156,410 B1
(45) Date of Patent: Jan. 2, 2007

(54) AUTOMATED STABILIZING SYSTEM FOR FIFTH WHEEL PLATE ASSEMBLIES

(76) Inventor: Gus Maskaleris, 103 Harvard Ct., Glenview, IL (US) 60025

( * ) Notice: Subject to any disclaimer, the term of this patent is extended or adjusted under 35 U.S.C. 154(b) by 143 days.

(21) Appl. No.: 11/043,851

(22) Filed: Jan. 27, 2005

(51) Int. Cl.
*B62D 53/08* (2006.01)

(52) U.S. Cl. .................... 280/432; 280/433; 280/455.1

(58) Field of Classification Search ........ 280/432–434, 280/455.1
See application file for complete search history.

(56) References Cited

U.S. PATENT DOCUMENTS

| | | | |
|---|---|---|---|
| 3,972,542 A | | 8/1976 | Dirks et al. |
| 4,119,330 A | | 10/1978 | Capps |
| 4,438,943 A | * | 3/1984 | Hebert .................. 280/432 |
| 4,934,727 A | | 6/1990 | Hawkins et al. |
| 5,259,640 A | * | 11/1993 | Mackey .................. 280/432 |
| 5,456,483 A | * | 10/1995 | Madsen et al. ............. 280/432 |
| 6,688,631 B1 | | 2/2004 | Andre |

* cited by examiner

*Primary Examiner*—Lesley D. Morris
*Assistant Examiner*—L. Lum

(57) ABSTRACT

A stabilizing system includes multi-stage locking pins connected to a trailer fifth-wheel plate and a tractor fifth wheel plate. Each multi-stage locking pin includes contiguous members that have altering diameters. A mechanism is included for telescopically displacing the contiguous members such that the contiguous members become aligned within a pair of apertures in the fifth-wheel plate assembly. The apertures are movable about the multi-stage locking pins. A speed detecting mechanism cooperates with the displacing mechanism for automatically adjusting the tolerance angle. The speed detecting mechanism emits intermittent notification signals to the displacing mechanism during transit. The tolerance angle has an inverse relationship to the tractor speed. A lower one of the contiguous members has a diameter generally equal to a diameter of the apertures respectively and a top one of the contiguous members has a diameter less than the aperture diameters.

15 Claims, 7 Drawing Sheets

AUTOMATED STABILIZING SYSTEM FOR FIFTH WHEEL PLATE ASSEMBLIES

CROSS REFERENCE TO RELATED APPLICATIONS

Not Applicable.

STAGEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to stabilizing systems and, more particularly, to an automated stabilizing system for fifth wheel plate assemblies.

2. Prior Art

The risks and dangers associated with yawing trailers during descent at certain speeds are well-known. These conditions can even cause the trailer to tip or shift sideways, known as being "jackknifed".

A jackknife is a known condition wherein a trailer follows a tractor in such a way that the longitudinal axis of the trailer is oriented with respect to the longitudinal axis of the tractor at an angle of 90 degrees or more. The jackknife condition is often caused to occur when brakes are applied to both the tractor and the trailer, but the effective braking action of the trailer is less than that of the tractor. As a result, the momentum of the trailer causes the trailer to push up against the tractor, causing the rear of the tractor to swing out with respect to the front of the tractor. When a resulting angle is formed between the longitudinal axis of the tractor and the longitudinal axis of the trailer that is 90 degrees or less, the jackknife condition occurs. The jackknife condition is a dangerous condition for a number of reasons. The tractor and trailer move laterally out of their normal lane path. The driver of the tractor loses control of the tractor and trailer. The tractor and trailer have an increased tendency to flip over.

A number of devices for limiting such a yawing/jackknifing motion already exist. They consist mainly of telescoping lateral arms with damping effects. These arms are attached along the coupling on either side with a ball and socket connection at one extremity on the rear of the vehicle, and are attached to the coupling with a ball and socket connection at the other extremity. These arms are sufficient to limit small amplitude movements, but large trailers carrying heavy loads remain susceptible to danger.

Another example shows an anti-jackknife device that employs hydraulically operated retractable rods that keep the trailer in a straight-line condition with respect to the tractor. A significant disadvantage with the anti-jackknife device is that the straight-line condition is too restrictive for normal operation of a tractor and trailer. Often, roads have curves, and the straight-line condition may be too restrictive for successfully following a curve in the road without disabling the system. In this respect, it would be desirable if an anti-jackknife device were provided which did not maintain a tractor and trailer in a straight-line orientation.

Accordingly, a need remains for an automated stabilizing system for fifth wheel plate assemblies in order to overcome the above-noted shortcomings. The present invention satisfies such a need by providing a fifth wheel plate assembly stabilizing system that is conveniently automatic in its operation, provides increased safety to the truck driver and other motorists, and is easily installed on old trucks or newly produced trucks. Instead of a tractor being permitted to create a jackknife angle with the trailer, the system restricts the pivoting action of the trailer with respect to the fifth wheel, thus advantageously keeping the trailer from being jackknifed. Such a system helps to prevent serious injuries, possible fatalities and decreases insurance costs for trucking companies. The system furthermore keeps the truck and trailer from being seriously damaged so that revenue-producing equipment remains on the road, instead of in the repair shop.

BRIEF SUMMARY OF THE INVENTION

In view of the foregoing background, it is therefore an object of the present invention to provide an automated stabilizing system for fifth wheel plate assemblies. These and other objects, features, and advantages of the invention are provided by an automated stabilizing system conveniently retrofitable onto an existing fifth-wheel plate assembly for improving driver safety during high-speed transits.

The stabilizing system includes a plurality of multi-stage locking pins operably connected to a trailer fifth-wheel plate and a tractor fifth wheel plate such that the trailer and tractor fifth wheel plates become adjustably engageable. Each multi-stage locking pin includes a plurality of contiguous members that have altering diameters respectively and are centered about a vertically extending longitudinal axis associated with each multi-stage locking pin respectively. Each contiguous member has a cylindrical cross-section.

A mechanism is included for telescopically displacing the contiguous members along the vertical axes respectively such that altering ones of the contiguous members become centrally aligned within a pair of apertures formed in the fifth-wheel plate assembly. Such apertures have substantially annular shapes and are selectively movable about the multi-stage locking pins such that a lateral displacement of the tractor fifth-wheel plate can advantageously be limited to a predetermined tolerance angle offset from the trailer fifth-wheel plate.

The displacing mechanism preferably includes a plurality of hydraulic cylinders and a proportioning valve operably connected thereto for regulating a rectilinear movement of the contiguous members along the respective vertical axes. A hydraulic system and a microprocessor may be electrically coupled thereto. Such a microprocessor includes preprogrammed logic control for executing an algorithm based upon the intermittent signals such that the microprocessor can generate and transmit a series of corresponding control signals to the hydraulic system and proportionally siphon a volume of fluid to the hydraulic cylinders during transit.

The system further includes a mechanism for detecting a speed of the tractor wherein the speed detecting mechanism effectively cooperates with the displacing mechanism for conveniently and automatically adjusting the tolerance angle based upon a corresponding fluctuation in the tractor's speed. Such a tractor speed detecting mechanism emits a series of intermittent notification signals to the displacing mechanism during transit, wherein the tolerance angle has an inverse relationship to the tractor speed. The tractor speed detecting mechanism may include a vehicle speed sensor electrically mated to a speedometer of the tractor and cooperating therewith for advantageously updating a real-time speed of the tractor during operating conditions.

A lower one of the contiguous members has a diameter generally equal to a diameter of the apertures respectively and a top one of the contiguous members has a diameter less than the aperture diameters. A first contiguous member may be associated with a first operating stage for allowing the fifth-wheel plate assembly to articulate along a first arcuate path. A second contiguous member may be associated with a second operating stage for allowing the fifth-wheel plate assembly to rotate along a second arcuate path. A third contiguous member may be associated with a third operating stage for restricting the fifth-wheel plate assembly from rotating beyond a third arcuate path. Preferably, the first arcuate path extends beyond at least one quadrant and the second arcuate path is defined within the one quadrant and is greater than the first arcuate path.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
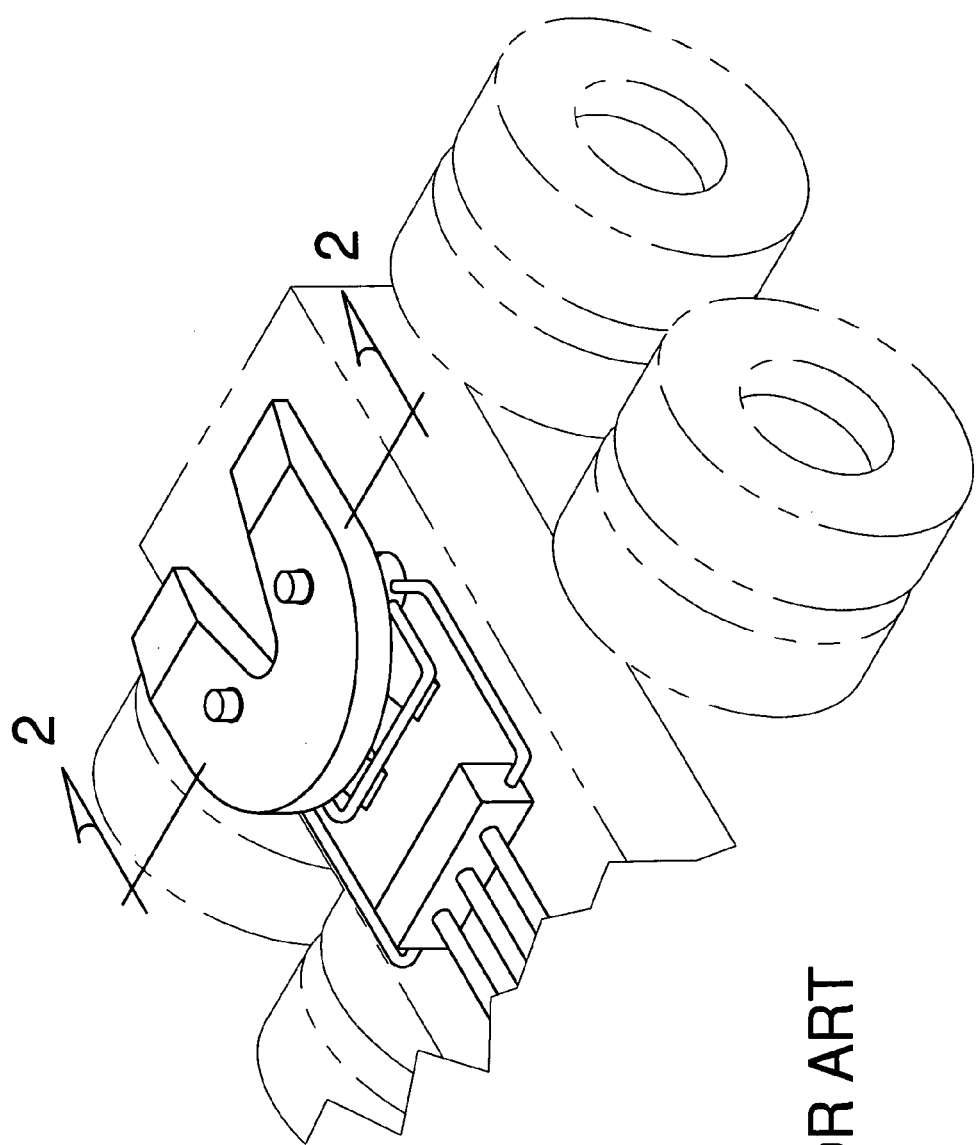
FIG. 1 is a perspective view showing a prior art system for stabilizing fifth wheel plate assemblies.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1–7 by the reference numeral 10 and is intended to provide an automated stabilizing system for fifth wheel plate assemblies. It should be understood that the system 10 may be used to stabilize many different types of trailers and should not be limited in use to only tractor-trailer combinations.

Figure 2:
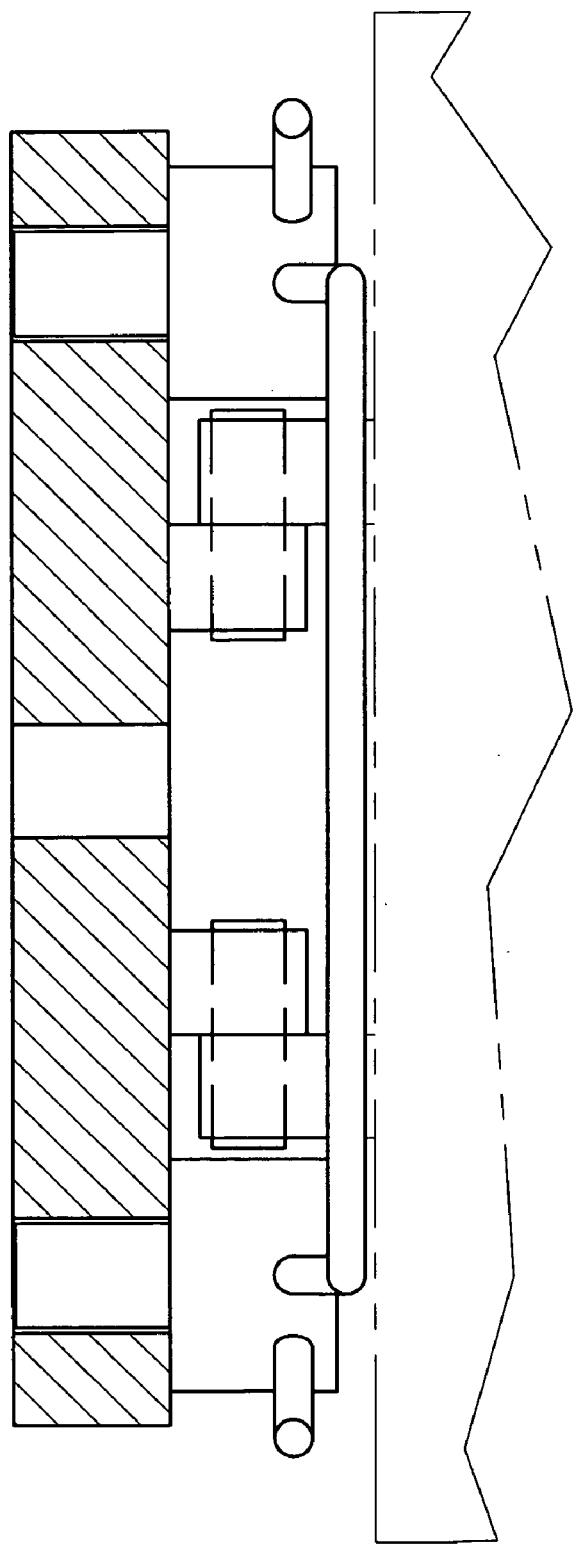
FIG. 2 is a cross-sectional view of the prior art system shown in FIG. 1, taken along line 2—2.

FIGS. 1 and 2 show a prior art example of a conventional fifth wheel plate assembly stabilizing system currently employed in the industry.

Figure 3:
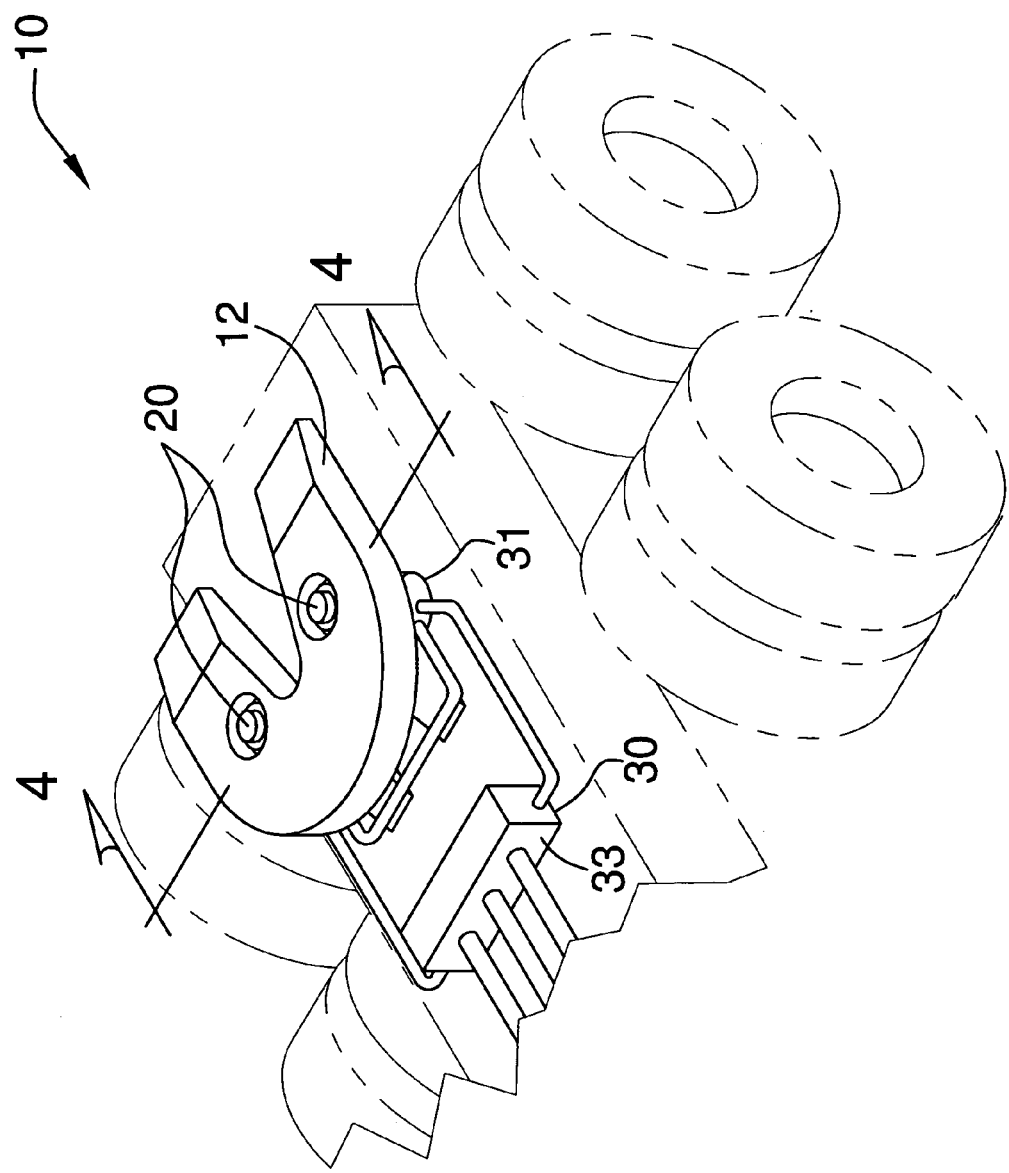
FIG. 3 is a perspective view showing an automated system for stabilizing fifth wheel plate assemblies, in accordance with the present invention.
Figure 4A:
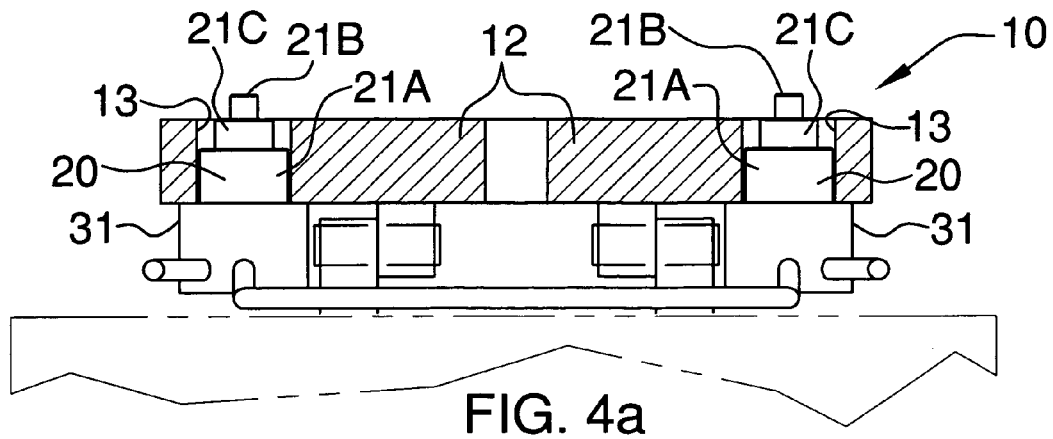
FIGS. 4a–4c are cross-sectional views of the system shown in FIG. 3, taken along line 4—4, wherein the contiguous members are displaced at alternate stages.
Figure 4B:
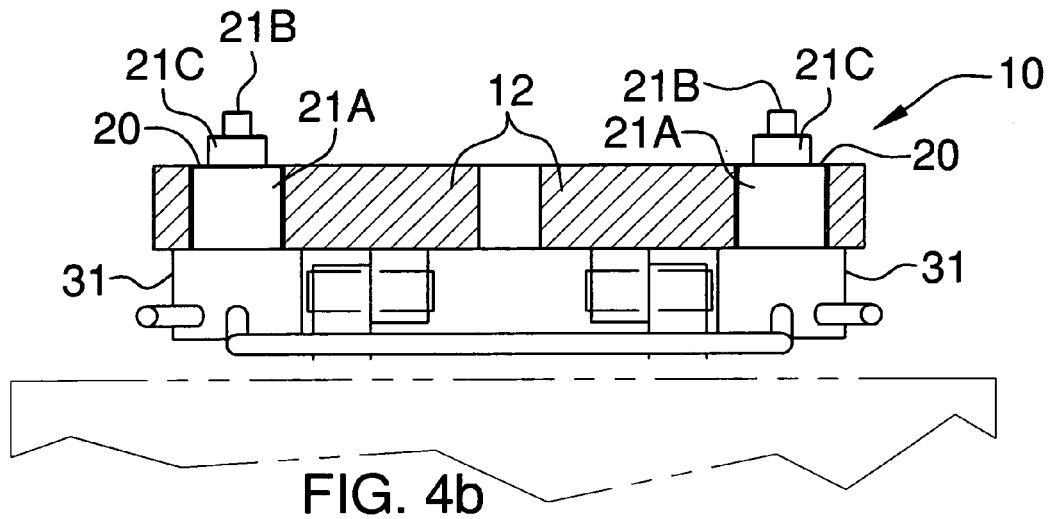
Figure 4C:
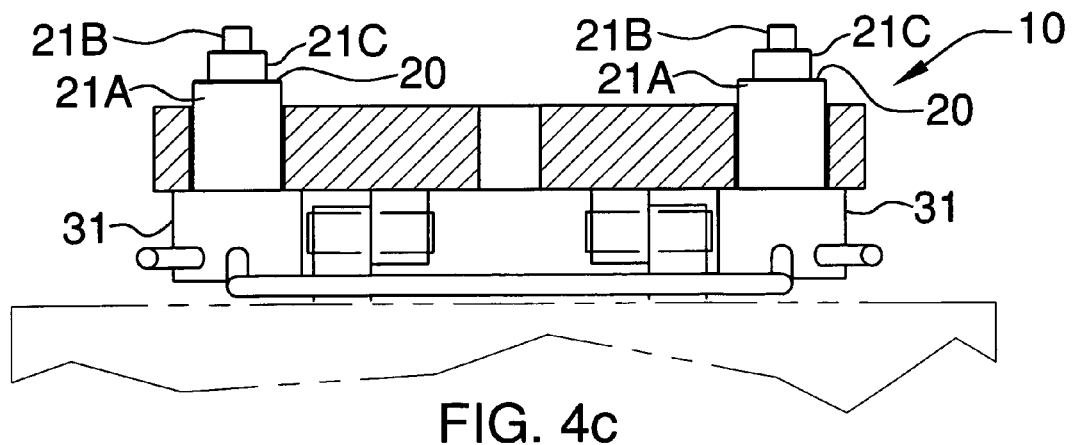
Figure 5:
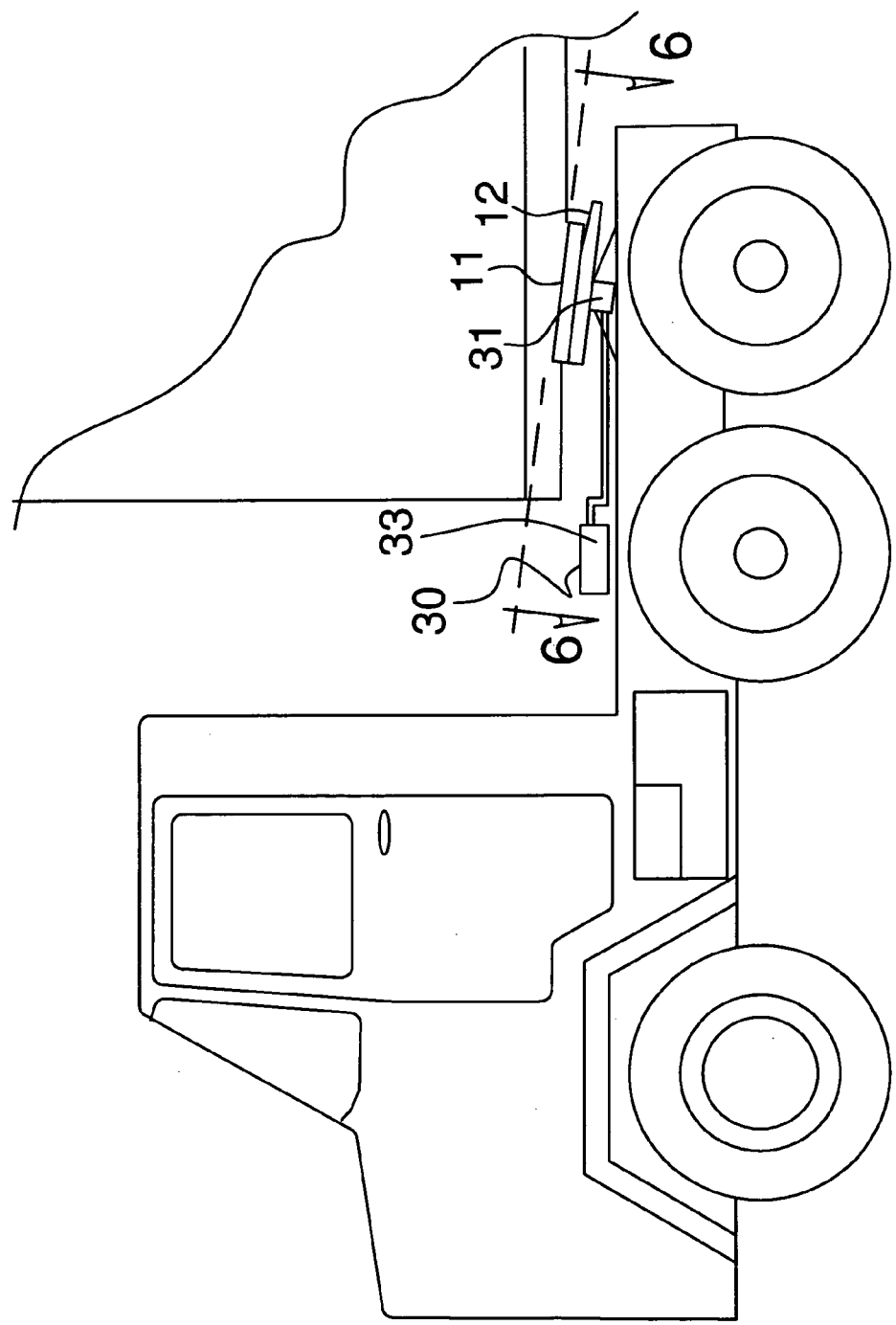
FIG. 5 is a side elevational view of the system shown in FIG. 3, showing the stabilizing system during operating conditions.
Figure 6C:
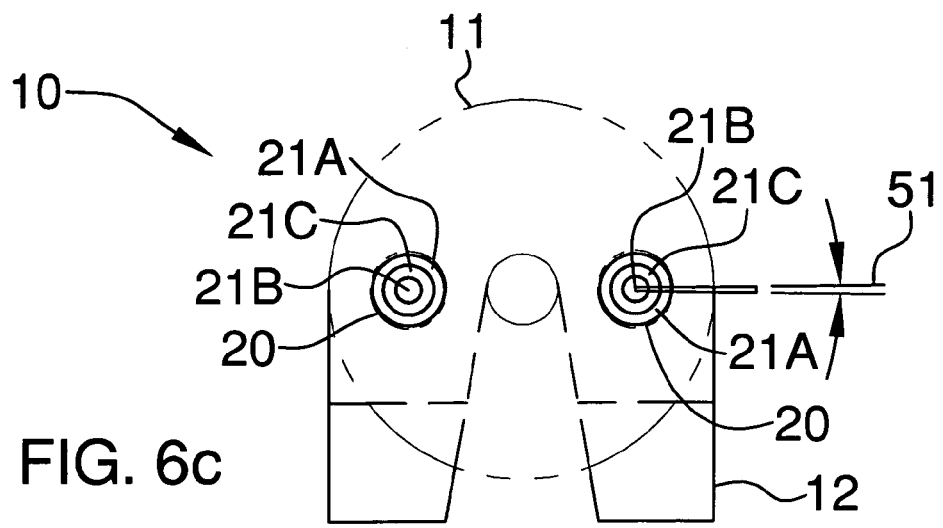
FIGS. 6a–6c are cross-sectional views of the system shown in FIG. 3, taken along line 6—6, wherein the various tolerance angles associated with the alternate displacements of the contiguous members are illustrated.
Figure 6B:
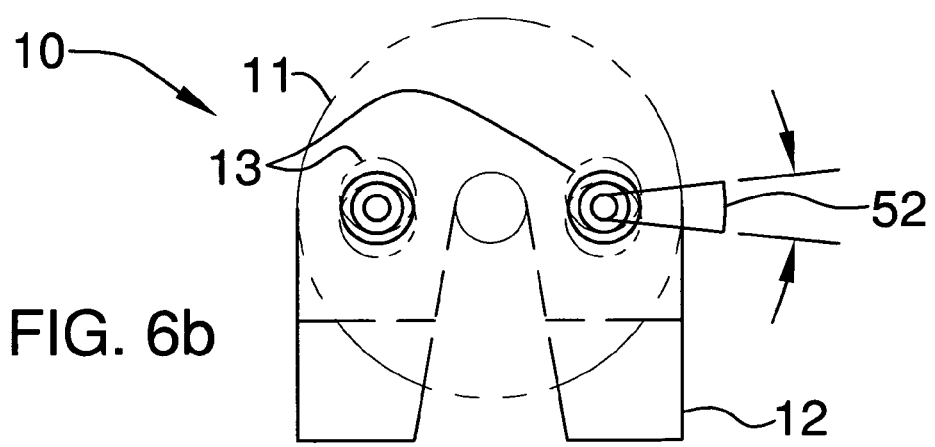
Figure 6A:
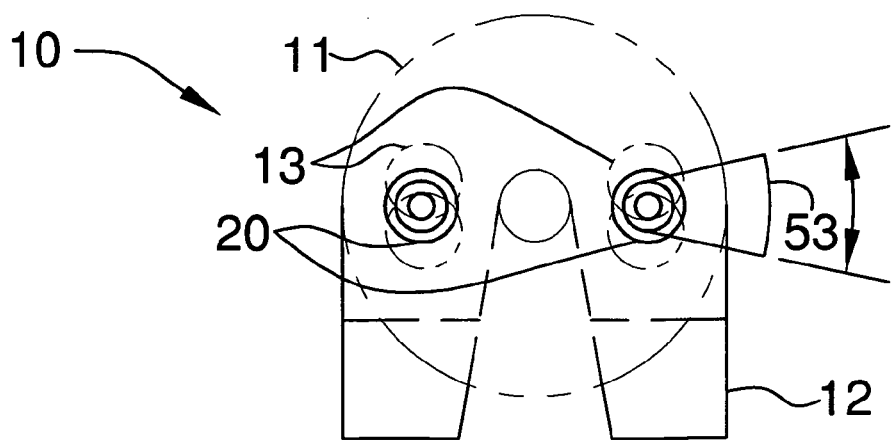

Referring initially to FIGS. 3 and 5, the system 10 includes a plurality of multi-stage locking pins 20 operably connected to a trailer fifth-wheel plate 11 and a tractor fifth wheel plate 12 such that the trailer 11 and tractor 12 fifth wheel plates become adjustably engageable. Each multi-stage locking pin 20 includes a plurality of contiguous members 21 that have altering diameters respectively and are centered about a vertically extending longitudinal axis associated with each multi-stage locking pin 20 respectively. Each contiguous member 21 has a cylindrical cross-section.

Referring to FIG. 4, a mechanism 30 is included for telescopically displacing the contiguous members 21 along the vertical axes respectively such that altering ones of the contiguous members 21 become centrally aligned within a pair of apertures 13 formed in the fifth-wheel plate assembly 12. Such apertures 13 have substantially annular shapes and are selectively movable about the multi-stage locking pins 20 such that a lateral displacement of the tractor fifth-wheel plate 12 can advantageously be limited to a predetermined tolerance angle offset from the trailer fifth-wheel plate 11.

Figure 7:
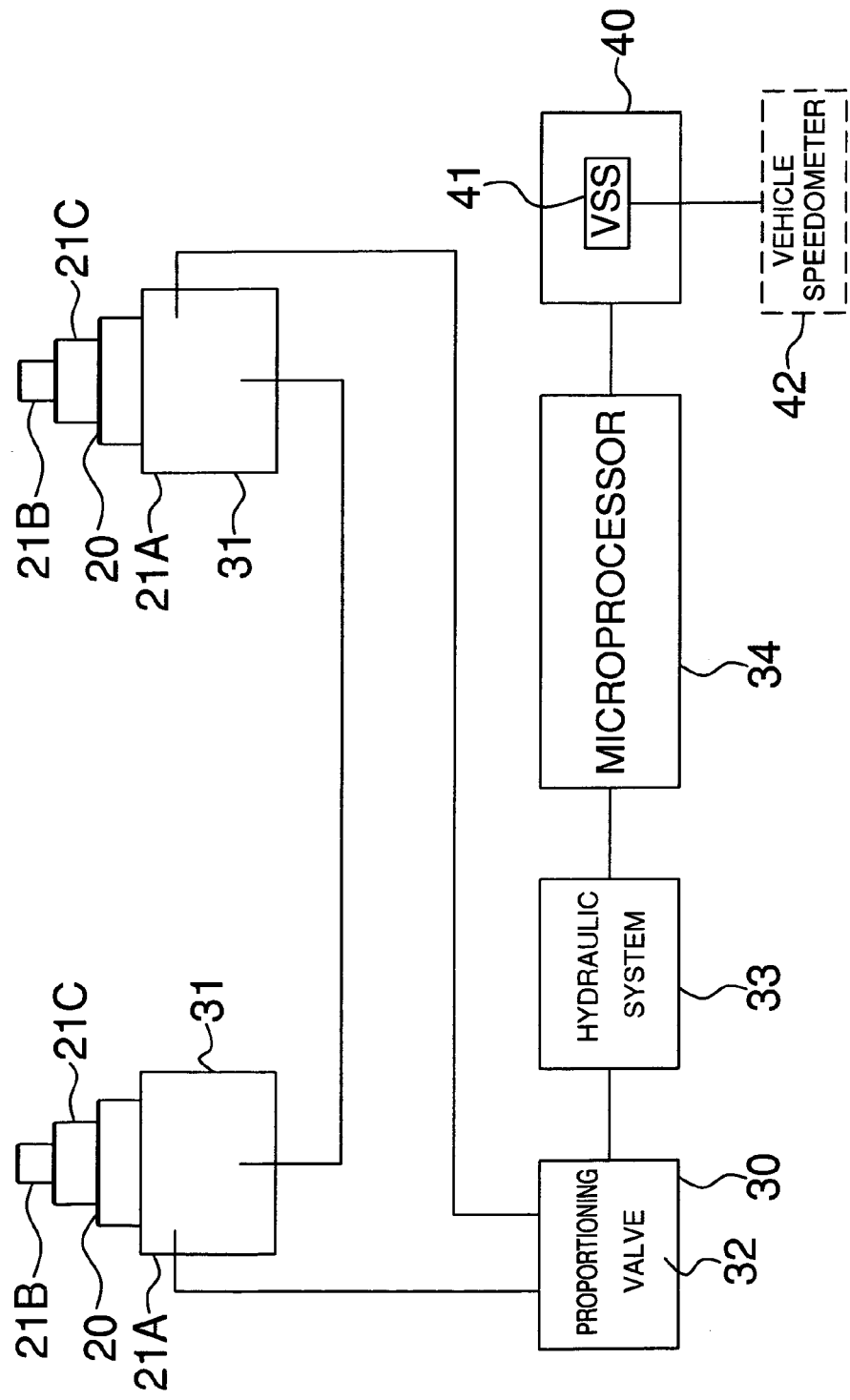
FIG. 7 is a schematic block diagram of the automated stabilizing system shown in FIG. 3

Referring to FIGS. 4 and 7, the displacing mechanism 30 includes a plurality of hydraulic cylinders 31 and a proportioning valve 32 operably connected thereto for regulating a rectilinear movement of the contiguous members 21 along the respective vertical axes. A hydraulic system 33 and a microprocessor 34 are electrically coupled thereto. Such a microprocessor 34 includes preprogrammed logic control for executing an algorithm based upon the intermittent signals such that the microprocessor 34 can generate and transmit a series of corresponding control signals to the hydraulic system 33 and proportionally siphon a volume of fluid to the hydraulic cylinders 31 during transit.

Referring to FIGS. 6 and 7, the system 10 further includes a mechanism 40 for detecting a speed of the tractor wherein the speed detecting mechanism 40 effectively cooperates with the displacing mechanism 30 for conveniently and automatically adjusting the tolerance angle based upon a corresponding fluctuation in the tractor's speed. Such a tractor speed detecting mechanism 40 emits a series of intermittent notification signals to the displacing mechanism 30 during transit, wherein the tolerance angle has an inverse relationship to the tractor speed. This feature is advantageous in the sense that less trailer rotation is allowed at higher speeds and more rotation is allowed at lower speeds, thus not restricting the truck from traveling along curves and bends in the road.

The tractor speed detecting mechanism 40 includes a vehicle speed sensor 41 electrically mated to a speedometer 42 of the tractor and cooperating therewith for advantageously updating a real-time speed of the tractor during operating conditions. Updating of the tractor's real-time speed conveniently allows the automated system 10 to allow for a sufficient amount of pivoting required at the current driving speed.

Referring to FIGS. 4a through 4c and FIGS. 6a through 6c, a lower one 21A of the contiguous members 21 has a diameter generally equal to a diameter of the apertures 13 respectively and a top one 21B of the contiguous members 21 has a diameter less than the aperture diameters. A first contiguous member 21A is associated with a first operating stage for allowing the fifth-wheel plate assembly 12 to articulate along a first arcuate path 51. A second contiguous member 21C is associated with a second operating stage for allowing the fifth-wheel plate assembly 12 to rotate along a second arcuate path 52. A third contiguous member 21B is associated with a third operating stage for restricting the fifth-wheel plate assembly 12 from rotating beyond a third arcuate path 53. The first arcuate path 51 extends beyond at least one quadrant and the second arcuate path 52 is defined within the one quadrant and is greater than the first arcuate path 51.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An automated stabilizing system retrofitable onto an existing fifth-wheel plate assembly for improving driver safety during high-speed transits, said stabilizing system comprising:
   a plurality of multi-stage locking pins operably connected to a trailer fifth-wheel plate and a tractor fifth wheel plate such that the trailer and tractor fifth wheel plates become adjustably engageable, each said multi-stage locking pin including a plurality of contiguous members having altering diameters respectively and being centered about a vertically extending longitudinal axis associated with each said multi-stage locking pin respectively;
   means for telescopically displacing said contiguous members along the vertical axes respectively such that altering ones of said contiguous members become centrally aligned within a pair of apertures formed in the fifth-wheel plate assembly, the apertures having substantially annular shapes and being selectively movable about said multi-stage locking pins such that a lateral displacement of the tractor fifth-wheel plate can be limited to a predetermined tolerance angle offset from the trailer fifth-wheel plate; and
   means for detecting a speed of the tractor wherein said speed detecting means cooperates with said displacing means for automatically adjusting the tolerance angle based upon a corresponding to fluctuations in the tractor speed, said tractor speed detecting means emitting a series of intermittent notification signals to said displacing means during transit, wherein the tolerance angle has an inverse relationship to the tractor speed.

2. The system of claim 1, wherein said displacing means comprises:
   a plurality of hydraulic cylinders and a proportioning valve operable connected thereto for regulating a rectilinear movement of said contiguous members along the respective vertical axes; and
   a hydraulic system and a microprocessor electrically coupled thereto, said microprocessor including preprogrammed logic control for executing an algorithm based upon said intermittent signals such that said microprocessor can generate and transmit a series of corresponding control signals to said hydraulic system and proportionally siphon a volume of fluid to said hydraulic cylinders during transit.

3. The system of claim 2, wherein said tractor speed detecting means comprises:
   a vehicle speed sensor electrically mated to a speedometer of the tractor and cooperating therewith for updating a real-time speed of the tractor during operating conditions.

4. The system of claim 1, wherein a first said contiguous member is associated with a first operating stage for allowing said fifth-wheel plate assembly to articulate along a first arcuate path, a second said contiguous member being associated with a second operating stage for allowing said fifth-wheel plate assembly to rotate along a second arcuate path, and a third contiguous member being associated with a third operating stage for restricting the fifth-wheel plate assembly from rotating beyond a third arcuate path.

5. The system of claim 4, wherein said first arcuate path extends beyond at least one quadrant, said second arcuate path is defined within said one quadrant and greater than said first arcuate path.

6. An automated stabilizing system retrofitable onto an existing fifth-wheel plate assembly for improving driver safety during high-speed transits, said stabilizing system comprising:
   a plurality of multi-stage locking pins operably connected to a trailer fifth-wheel plate and a tractor fifth wheel plate such that the trailer and tractor fifth wheel plates become adjustably engageable, each said multi-stage locking pin including a plurality of contiguous members having altering diameters respectively and being centered about a vertically extending longitudinal axis associated with each said multi-stage locking pin respectively; wherein each said contiguous member has a cylindrical cross-section;
   means for telescopically displacing said contiguous members along the vertical axes respectively such that altering ones of said contiguous members become centrally aligned within a pair of apertures formed in the fifth-wheel plate assembly, the apertures having substantially annular shapes and being selectively movable about said multi-stage locking pins such that a lateral displacement of the tractor fifth-wheel plate can be limited to a predetermined tolerance angle offset from the trailer fifth-wheel plate; and
   means for detecting a speed of the tractor wherein said speed detecting means cooperates with said displacing means for automatically adjusting the tolerance angle based upon a corresponding to fluctuations in the tractor speed, said tractor speed detecting means emitting a series of intermittent notification signals to said displacing means during transit, wherein the tolerance angle has an inverse relationship to the tractor speed.

7. The system of claim 6, wherein said displacing means comprises:
- a plurality of hydraulic cylinders and a proportioning valve operable connected thereto for regulating a rectilinear movement of said contiguous members along the respective vertical axes; and
- a hydraulic system and a microprocessor electrically coupled thereto, said microprocessor including preprogrammed logic control for executing an algorithm based upon said intermittent signals such that said microprocessor can generate and transmit a series of corresponding control signals to said hydraulic system and proportionally siphon a volume of fluid to said hydraulic cylinders during transit.

8. The system of claim 7, wherein said tractor speed detecting means comprises:
- a vehicle speed sensor electrically mated to a speedometer of the tractor and cooperating therewith for updating a real-time speed of the tractor during operating conditions.

9. The system of claim 6, wherein a first said contiguous member is associated with a first operating stage for allowing said fifth-wheel plate assembly to articulate along a first arcuate path, a second said contiguous member being associated with a second operating stage for allowing said fifth-wheel plate assembly to rotate along a second arcuate path, and a third contiguous member being associated with a third operating stage for restricting the fifth-wheel plate assembly from rotating beyond a third arcuate path.

10. The system of claim 9, wherein said first arcuate path extends beyond at least one quadrant, said second arcuate path is defined within said one quadrant and greater than said first arcuate path.

11. An automated stabilizing system retrofitable onto an existing fifth-wheel plate assembly for improving driver safety during high-speed transits, said stabilizing system comprising:
- a plurality of multi-stage locking pins operably connected to a trailer fifth-wheel plate and a tractor fifth wheel plate such that the trailer and tractor fifth wheel plates become adjustably engageable, each said multi-stage locking pin including a plurality of contiguous members having altering diameters respectively and being centered about a vertically extending longitudinal axis associated with each said multi-stage locking pin respectively; wherein each said contiguous member has a cylindrical cross-section;
- means for telescopically displacing said contiguous members along the vertical axes respectively such that altering ones of said contiguous members become centrally aligned within a pair of apertures formed in the fifth-wheel plate assembly, the apertures having substantially annular shapes and being selectively movable about said multi-stage locking pins such that a lateral displacement of the tractor fifth-wheel plate can be limited to a predetermined tolerance angle offset from the trailer fifth-wheel plate; and
- means for detecting a speed of the tractor wherein said speed detecting means cooperates with said displacing means for automatically adjusting the tolerance angle based upon a corresponding to fluctuations in the tractor speed, said tractor speed detecting means emitting a series of intermittent notification signals to said displacing means during transit, wherein the tolerance angle has an inverse relationship to the tractor speed;
- wherein a lower one of each said contiguous members has a diameter generally equal to a diameter of the apertures respectively, a top one of each said contiguous members has a diameter less than the aperture diameters.

12. The system of claim 11, wherein said displacing means comprises:
- a plurality of hydraulic cylinders and a proportioning valve operable connected thereto for regulating a rectilinear movement of said contiguous members along the respective vertical axes; and
- a hydraulic system and a microprocessor electrically coupled thereto, said microprocessor including preprogrammed logic control for executing an algorithm based upon said intermittent signals such that said microprocessor can generate and transmit a series of corresponding control signals to said hydraulic system and proportionally siphon a volume of fluid to said hydraulic cylinders during transit.

13. The system of claim 12, wherein said tractor speed detecting means comprises:
- a vehicle speed sensor electrically mated to a speedometer of the tractor and cooperating therewith for updating a real-time speed of the tractor during operating conditions.

14. The system of claim 11, wherein a first said contiguous member is associated with a first operating stage for allowing said fifth-wheel plate assembly to articulate along a first arcuate path, a second said contiguous member being associated with a second operating stage for allowing said fifth-wheel plate assembly to rotate along a second arcuate path, and a third contiguous member being associated with a third operating stage for restricting the fifth-wheel plate assembly from rotating beyond a third arcuate path.

15. The system of claim 14, wherein said first arcuate path extends beyond at least one quadrant, said second arcuate path is defined within said one quadrant and greater than said first arcuate path.

\* \* \* \* \*